US012606013B2

(12) United States Patent (10) Patent No.: US 12,606,013 B2
Tanaka et al. (45) Date of Patent: Apr. 21, 2026

(54) WORK MACHINE

(71) Applicant: KUBOTA CORPORATION, Osaka (JP)

(72) Inventors: Ryosuke Tanaka, Sakai (JP); Naoya Okamoto, Sakai (JP); Katsumi Yanagihara, Sakai (JP); Nobuki Daimon, Sakai (JP); Yuta Tsujimoto, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 438 days.

(21) Appl. No.: 18/071,678

(22) Filed: Nov. 30, 2022

(65) Prior Publication Data

US 2023/0202290 A1 Jun. 29, 2023

(30) Foreign Application Priority Data

Dec. 27, 2021 (JP) ................................. 2021-213150

(51) Int. Cl.
B60K 13/04 (2006.01)

(52) U.S. Cl.
CPC ......... B60K 13/04 (2013.01); B60Y 2200/221 (2013.01)

(58) Field of Classification Search
CPC .... B60K 13/04; B60Y 2200/221; Y02A 50/20

USPC .......................................................... 180/309
See application file for complete search history.

(56) References Cited

U.S. PATENT DOCUMENTS

| | | | |
|---|---|---|---|
| 2007/0119985 A1 | 5/2007 | Ranganathan et al. | |
| 2013/0186077 A1* | 7/2013 | Morimoto | F01N 3/00 |
| | | | 60/324 |
| 2016/0236541 A1* | 8/2016 | Gruenbeck | B60H 1/3414 |
| 2020/0003100 A1* | 1/2020 | Jan | F01N 3/2892 |

FOREIGN PATENT DOCUMENTS

| | | |
|---|---|---|
| JP | 2009068422 A | 4/2009 |
| JP | 2013049405 A | 3/2013 |
| JP | 2013-241868 A | 12/2013 |
| JP | 2021050687 A | 4/2021 |

* cited by examiner

*Primary Examiner* — Yi-Kai Wang
(74) *Attorney, Agent, or Firm* — Keating & Bennett, LLP

(57) ABSTRACT

A work machine includes an exhaust pipe and an outside air mixing cylinder including a guiding cylinder section and an expanding cylinder section, the guiding cylinder section including an exhaust gas guide path to guide exhaust gas from a downstream end of the exhaust pipe in a discharge direction of the exhaust pipe, the expanding cylinder section including a structure with a cross-sectional area of a flow path thereof that becomes larger in diameter to cause a Coanda effect on the exhaust gas so that the exhaust gas follows an inner surface of the expanding cylinder section.

8 Claims, 10 Drawing Sheets

Fig.12

● Hi-idle state

Unit:[m³/s]

| | 1. Amount of Gas Flowed | 2. Amount of Outside Air Sucked | 3. Amount of Outside Air Pulled In (Evaluation Plane 1) | 4. Amount of Outside Air Pulled In (Evaluation Plane 2) | 5. Amount of Gas Flowed (Evaluation Plane 2) |
|---|---|---|---|---|---|
| Conventional | 0.048 | 0.054 | 0.000 | 0.124 | 0.2264 |
| Present invention | 0.048 | 0.044 | 0.027 | 0.165 | 0.2575 |
| | | −19% | Increased | +33% | +14% |

Fig.13

Unit:[m³/s]

● Lo-idle state

| | 1. Amount of Gas Flowed | 2. Amount of Outside Air Sucked | 3. Amount of Outside Air Pulled In (Evaluation Plane 1) | 4. Amount of Outside Air Pulled In (Evaluation Plane 2) | 5. Amount of Gas Flowed (Evaluation Plane 2) |
|---|---|---|---|---|---|
| Conventional | 0.025 | 0.028 | 0.000 | 0.060 | 0.113 |
| Present invention | 0.025 | 0.023 | 0.014 | 0.082 | 0.130 |
| | | −18% | Increased | +37% | +15% |

WORK MACHINE

CROSS REFERENCE TO RELATED APPLICATIONS

This application claims the benefit of priority to Japanese Patent Application No. 2021-213150 filed on Dec. 27, 2021. The entire contents of this application are hereby incorporated herein by reference.

BACKGROUND OF THE INVENTION

1. Field of the Invention

The present invention relates to a work machine including (i) an exhaust pipe to allow exhaust gas from an engine to flow therethrough and (ii) an outside air mixing cylinder downstream of the exhaust pipe.

2. Description of the Related Art

A known work machine including an exhauster device with an exhaust pipe and an outside air mixing cylinder such as the above includes an exhaust pipe upstream in the direction in which exhaust gas flows and an outside air mixing cylinder downstream of the exhaust pipe and having a diameter larger than the diameter of the exhaust pipe to form a gap between the outer circumferential portion of the exhaust pipe and the inner circumferential portion of the outside air mixing cylinder as an outside air introducing section. This structure allows exhaust gas discharged from the exhaust pipe and entering the outside air mixing cylinder to cause an ejector effect to introduce outside air through the outside air introducing section into the outside air mixing cylinder. This in turn causes the outside air to be mixed with the exhaust gas in the outside air mixing cylinder to cool and thin the exhaust gas, to finally discharge the mixed gas from the distal end of the outside air mixing cylinder (see, for example, Japanese Unexamined Patent Application Publication, Tokukai, No. 2013-241868).

SUMMARY OF THE INVENTION

The exhauster device disclosed in Japanese Unexamined Patent Application Publication, Tokukai, No. 2013-241868 may be useful, as it allows exhaust gas to be cooled and thinned with a simple structure. This structure, however, does not allow sufficient cooling and thinning if exhaust gas from the exhaust pipe has a high temperature or concentration. This conventional technique leaves room for improvement because it may require the exhauster device to include an outside air mixing cylinder with a larger length or diameter or to be complex in structure.

Preferred embodiments of the present invention provide work machines each including an exhauster device with a relatively simple structure that allows exhaust gas to be cooled and thinned more effectively.

A work machine according to a preferred embodiment of the present invention includes a body, an engine in the body, an exhaust pipe to allow exhaust gas from the engine to flow through the exhaust pipe, and an outside air mixing cylinder downstream of the exhaust pipe and including an upstream end that includes a flow path with a cross-sectional area larger than a cross-sectional area of a flow path at a downstream end of the exhaust pipe to define an outside air introducing section between an outer circumferential portion of the downstream end of the exhaust pipe and an inner circumferential portion of the upstream end of the outside air mixing cylinder, the outside air mixing cylinder including a guiding cylinder section disposed upstream, including a downstream end, and including a flow path with a cross-sectional area that becomes larger in diameter in a direction at a first rate, and an expanding cylinder section continuous with the downstream end of the guiding cylinder section and including a flow path with a cross-sectional area that becomes larger in diameter in the direction at a second rate higher than the first rate, the guiding cylinder section including an exhaust gas guide path to guide exhaust gas from the downstream end of the exhaust pipe in a discharge direction of the exhaust pipe, the expanding cylinder section including a structure to use the cross-sectional area of the flow path thereof that becomes larger in diameter to cause a Coanda effect on the exhaust gas from the exhaust gas guide path to so that the exhaust gas follows an inner surface of the expanding cylinder section.

Preferred embodiments of the present invention allow outside air to flow through the outside air introducing section into the guiding cylinder section of the outside air mixing cylinder and to be mixed with exhaust gas from the exhaust pipe inside the guiding cylinder section and expanding cylinder section of the outside air mixing cylinder to cool and thin the exhaust gas.

More specifically, the exhaust pipe discharges exhaust gas at a predetermined velocity. The exhaust gas enters the guiding cylinder section while pulling in outside air through the outside air introducing section, and flows through the guiding cylinder section toward the expanding cylinder section on the downstream side in the discharge direction. As the exhaust gas flowing through the guiding cylinder section slows to some degree, the exhaust gas flow is subjected to a Coanda effect, which causes the exhaust gas to become close to and follow one side of the inner surface at a position close to the distal end of the guiding cylinder section or inside the expanding cylinder section.

This in turn causes outside air to enter the expanding cylinder section through the outlet thereof into a space on the side opposite to the side on which the exhaust gas follows the inner surface, that is, a space between the inner surface of the expanding cylinder section and the flow of the exhaust gas following the inner surface. This outside air is also mixed with the exhaust gas, meaning that the exhaust gas is mixed with both outside air pulled in through the outside air introducing section and outside air entering the expanding cylinder section through the outlet thereof. Preferred embodiments of the present invention thus allow exhaust gas to be mixed with more outside air to allow the exhaust gas to be cooled and thinned more effectively.

The guiding cylinder section may include a flat inner surface portion, and the expanding cylinder section may include a flat inner surface portion.

With the above configuration, the guiding cylinder section includes a flat inner surface portion, and the expanding cylinder section includes a flat inner surface portion. This allows the Coanda effect to act more effectively on the exhaust gas so that it follows the inner surface.

The outside air mixing cylinder may have a rectangular or substantially rectangular cross section.

With the above configuration, the outside air mixing cylinder has a rectangular or substantially rectangular cross section. This facilitates designing which side of the inner surface the exhaust gas is to follow. Further, an outside air mixing cylinder with a rectangular or substantially rectangular cross section can be produced more easily than one with a circular or polygonal cross section.

The downstream end of the exhaust pipe may include two flat wall portions circumferentially opposite to each other.

The above configuration allows the exhaust pipe to discharge exhaust gas in a flat shape, and thereby facilitates the Coanda effect.

The guiding cylinder section may include a flat inner surface portion, the expanding cylinder section may include a flat inner surface portion, and the two flat wall portions may be parallel or substantially parallel with the respective flat inner surface portions of the guiding cylinder section and the expanding cylinder section.

With the above configuration, the respective inner surfaces of the guiding cylinder section and the expanding cylinder section correspond to the flat shape of exhaust gas from the exhaust pipe. This further facilitates the Coanda effect.

The exhaust pipe and the outside air mixing cylinder may be arranged such that a single straight line connects respective areal centers of an exhaust port of the exhaust pipe, the guiding cylinder section, and the expanding cylinder section as viewed in the discharge direction.

The above configuration allows outside air to be pulled in through the outside air introducing section along its entire circumference with a smaller pressure loss, thereby allowing more outside air to be pulled in efficiently.

The exhaust pipe may include a distal end that coincides or substantially coincides with a starting end of the outside air mixing cylinder in the discharge direction.

The above configuration eliminates the risk of the flow path of the outside air mixing cylinder being narrowed by the exhaust pipe, thus preventing a pressure loss caused by narrowing of a flow path.

The work machine may preferably be arranged such that the exhaust pipe first guides the exhaust gas from laterally inward of the body toward laterally outward of the body and then changes a direction of the guide to a front-back direction of the body at a laterally outer portion of the body for discharge of the exhaust gas.

The above configuration causes exhaust gas to tend to flow outward from inward in a case where the exhaust gas flows through the exhaust pipe outward from laterally inward and changes its direction to a front-back direction of the body for discharge. The above configuration thus causes exhaust gas to tend to follow one side of the inner surface of the outside air mixing cylinder, thereby facilitating designing which side of the inner surface the exhaust gas is to follow due to the Coanda effect.

The outside air mixing cylinder may be between a body frame of the work machine and a front wheel of the work machine in a left-right direction of the body, and the guiding cylinder section may overlap with the front wheel in the front-back direction of the body, and the expanding cylinder section may be outside a range of movement of the front wheel.

With the above configuration, the outside air mixing cylinder is between the body frame and the front wheel, which prevents the outside air mixing cylinder from easily coming into contact with an object.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 12 is a table that shows the results of analyzing the amount of outside air sucked, the amount of outside air pulled in, and the amount of gas flowed in a high-idle state.

FIG. 13 is a table that shows the results of analyzing the amount of outside air sucked, the amount of outside air pulled in, and the amount of gas flowed in a low-idle state.

DETAILED DESCRIPTION OF THE PREFERRED EMBODIMENTS

The description below deals with example work machines as preferred embodiments of the present invention with reference to drawings.

Unless otherwise indicated, the description below uses (i) terms such as "front" to refer to the front side of the direction in which the work machine as the present preferred embodiment travels while performing work (indicated with arrow F in FIG. 1), (ii) terms such as "back" to refer to the back side of the same travel direction (indicated with arrow B in FIG. 1), (iii) terms such as "left" to refer to the left side relative to the front side (indicated with arrow L in FIG. 2), and (iv) terms such as "right" to refer to the right side relative to the front side (indicated with arrow R in FIG. 2).

Figure 1:
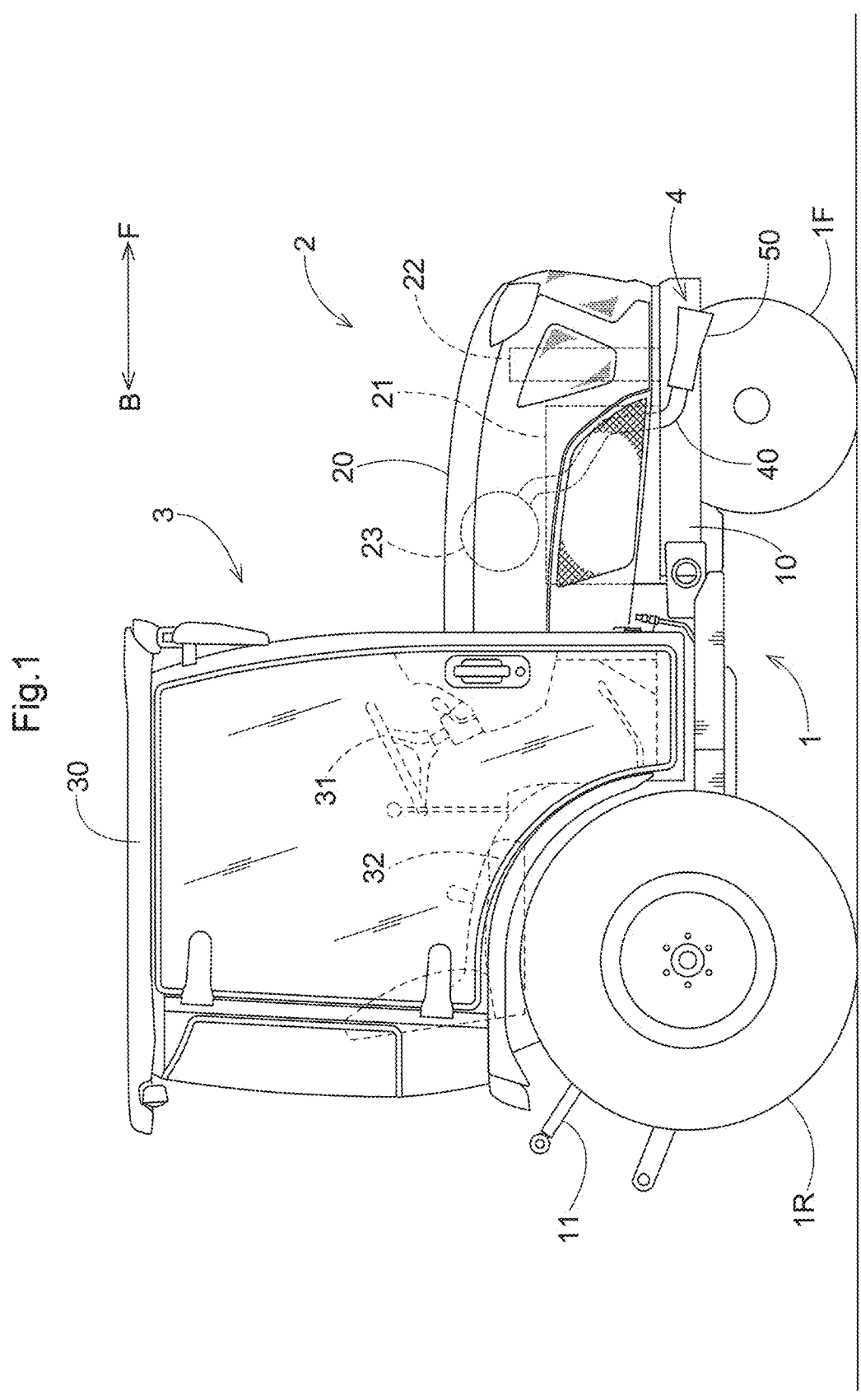
FIG. 1 is a side view of a tractor.

FIG. 1 is a side view of a tractor provided with a cabin as an example work machine according to a preferred embodiment of the present invention.

The tractor includes a body 1 equipped with left and right drivable front wheels 1F each having a changeable direction and left and right drivable rear wheels 1R. The tractor also includes a motor section 2 at a front portion of the body 1 and a driver section 3 provided with a driver cabin 30 at a back portion of the body 1. The body 1 includes a body frame 10 that allows the front wheels 1F and the rear wheels 1R to support the motor section 2 and the driver section 3.

The driver section 3 includes components such as a steering wheel 31 and a driver's seat 32 inside the driver cabin 30.

Figure 2:
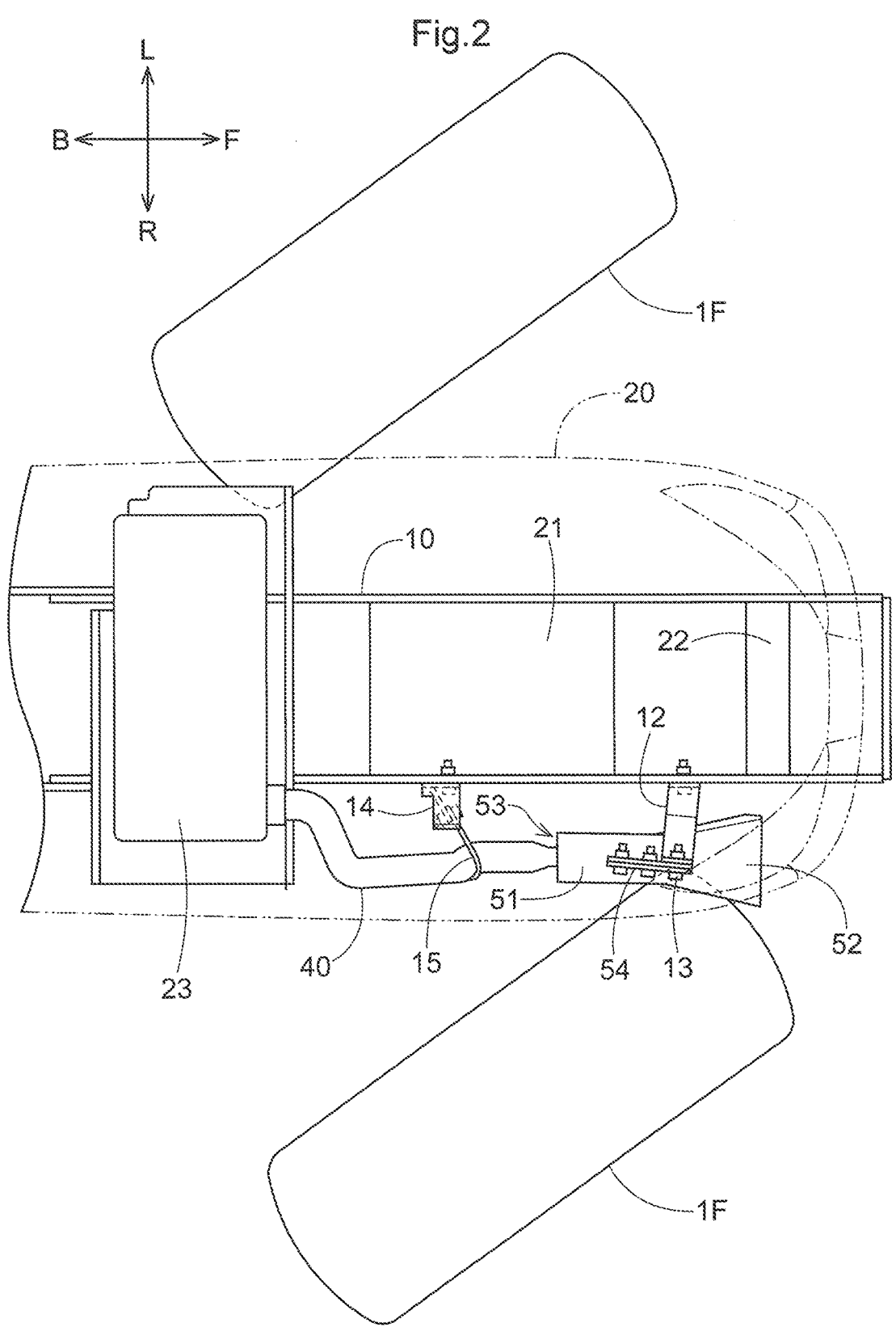
FIG. 2 is a plan view of a motor section and an exhauster device.

The motor section 2, as illustrated in FIGS. 1 and 2, includes an engine 21 in an engine room and an engine hood 20 configured to cover the engine room. The engine 21 is a diesel engine supported by the body frame 10 and vibration-isolated with use of a vibration isolator (not illustrated in the drawings). The engine 21 transmits its motive power to a travel transmission device (not illustrated in the drawings) in a transmission case (not illustrated the drawings) at a back portion of the body 1. The tractor includes a travel power transmission system including the travel transmission device and configured to transmit the motive power from the engine 21 to the front wheels 1F and the rear wheels 1R. The tractor is thus a four-wheel drive vehicle.

The tractor includes a pair of left and right lift arms 11 and a power take-off shaft (not illustrated in the drawings) at a back portion of the transmission case. The lift arms 11 are each configured to swing upward and downward in response to an operation of a hydraulic lifting and lowering cylinder (not illustrated in the drawings). The power take-off shaft is configured to transfer the motive power from the engine 21 to an external component. The power take-off shaft receives the motive power from the engine 21 through a work power transmission system, which is different from the travel power transmission system in the transmission case. The lift arms 11 are coupled to link mechanisms (not illustrated in the drawings) disposed at a back portion of the transmission case and swingable to be lifted and lowered. The power take-off shaft is connectable with, for example, a power transmission shaft to transmit motive power to a work device such as a rotary tiller device (not illustrated in the drawings) coupled to the link mechanisms.

The motor section 2 includes a radiator 22 and a fuel tank inside the engine room. The radiator 22 is disposed forward of the engine 21 relative to the body 1 and configured to cool the engine 21. The fuel tank is disposed backward of relative to the body 1 and apart from the engine 21. The motor section 2 also includes inside the engine room an air cleaner for the engine 21 (not illustrated in the drawings) and an exhaust gas cleaning device 23 including, for example, a diesel oxidation catalyst (DOC) and a diesel particulate filter (DPF) and performing a muffler function.

Figure 3:
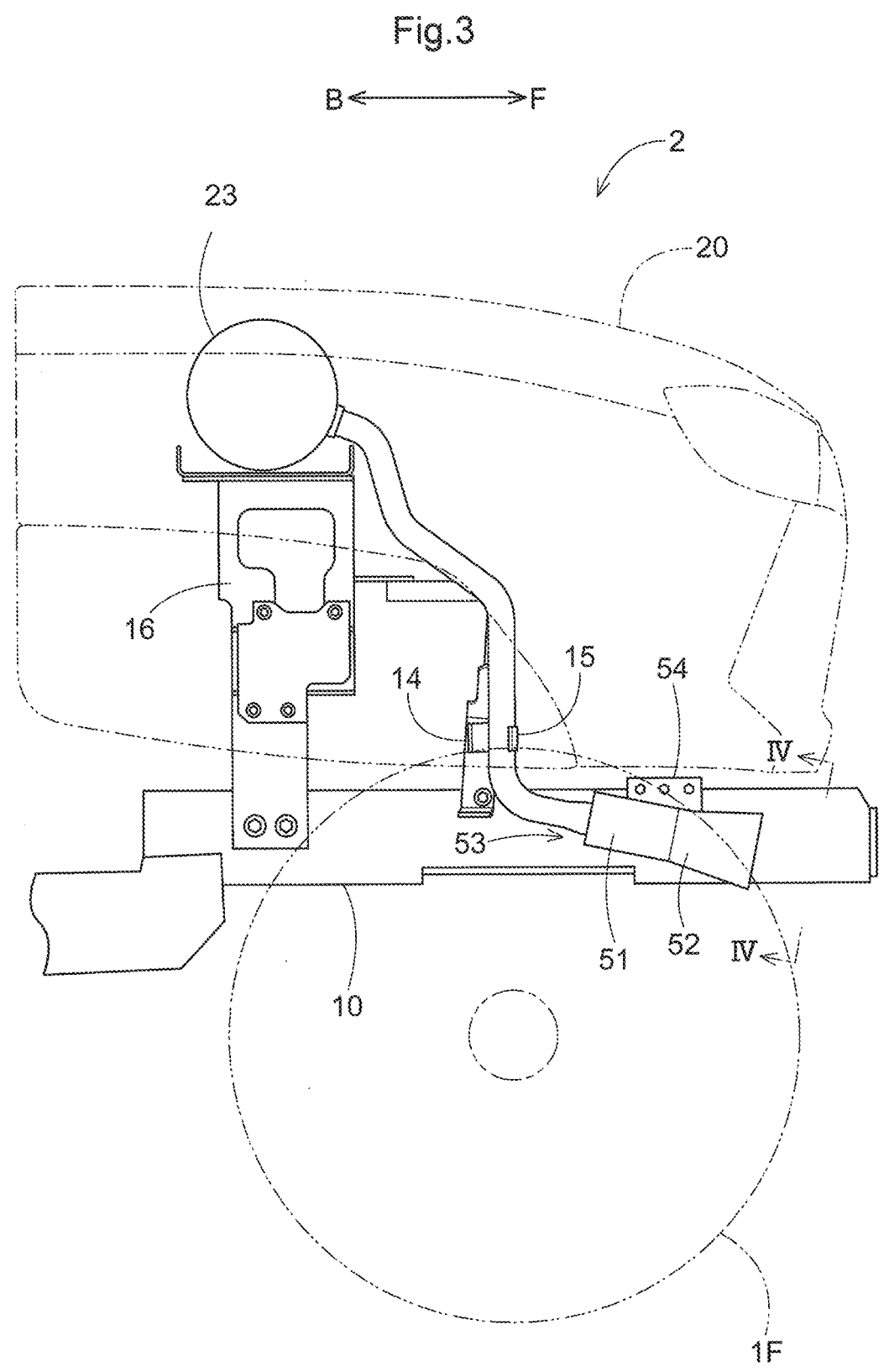
FIG. 3 is a side view of an exhauster device.

The exhaust gas cleaning device 23 is, as illustrated in FIGS. 2 and 3, supported by an arch-shaped support 16 extending upward from the body frame 10, and is above the engine 21. The exhaust gas cleaning device 23 is configured to collect particulate matter in exhaust gas from the engine 21 with use of the DPF and to oxidize and combust unburnt fuel in the exhaust gas with use of the DOC. This combustion heats the exhaust gas and incinerates the particulate matter captured by the DPF for regeneration of the DPF.

The tractor includes an exhauster device 4 configured to discharge exhaust gas emitted by the engine 21 and cleaned by the exhaust gas cleaning device 23.

As illustrated in FIGS. 2 to 5, the exhauster device 4 includes an exhaust pipe 40 and an outside air mixing cylinder 50. The exhaust pipe 40 allows exhaust gas H emitted by the engine 21 and cleaned by the exhaust gas cleaning device 23 to flow therethrough. The outside air mixing cylinder 50 is configured to mix the exhaust gas H from the exhaust pipe 40 with outside air G into mixed air K and discharge the mixed air K.

The exhaust pipe 40 first guides exhaust gas from laterally inward of the body 1 toward laterally outward of the body 1 and then changes the guiding direction to a front-back direction of the body 1 at a laterally outer portion of the body 1 for discharge of the exhaust gas. Referring to FIG. 2 for a more specific description, the exhaust gas cleaning device 23 is disposed inside the engine room laterally along a cylindrical axis direction. The exhaust gas cleaning device 23 has a left end portion configured to receive exhaust gas H from the engine 21 and a right end portion connected with the starting end portion of the exhaust pipe 40. The exhaust pipe 40 has a lower portion disposed laterally outward of the body frame 10, oriented in the front-back direction of the body 1, and extending obliquely forward and downward.

The above configuration allows exhaust gas H from the engine 21 to flow from left to right inside the exhaust gas cleaning device 23, be discharged from the right end portion of the exhaust gas cleaning device 23 while turning into the front-back direction at the position at which the right end portion is connected with the exhaust pipe 40, and then be guided through the exhaust pipe 40 obliquely forward and downward while being slightly toward the right, to finally be discharged from the exhaust pipe 40.

The exhaust pipe 40 has a circular cross section over most of its length, specifically from that portion which is connected with the right end portion of the exhaust gas cleaning device 23 to a portion close to the distal end in the discharge direction. The exhaust pipe 40 has an exhaust port 41 at its end in the discharge direction, the end being oblong with a vertical dimension larger than its lateral dimension as a result of lateral compression (see FIG. 4). The oblong end has a flow path with a cross-sectional area equal to that of the flow path at the upstream portion with a circular cross section. With the end narrowed laterally and elongated vertically in cross section, the exhaust pipe 40 discharges from the exhaust port 41 an exhaust gas flow with a cross section larger in the vertical direction than in the lateral direction.

The outside air mixing cylinder 50, as illustrated in FIGS. 2 to 5, includes a guiding cylinder section 51 disposed upstream and an expanding cylinder section 52 continuous with the downstream end of the guiding cylinder section 51. The expanding cylinder section 52 has a flow path with a cross-sectional area that becomes larger in the flaring direction at a rate higher than the rate for the guiding cylinder section 51. Specifically, the guiding cylinder section 51 has a flow path that has a fixed or substantially fixed cross-sectional area, with a small rate of variation, whereas the expanding cylinder section 52 has a flow path with a cross-sectional area that becomes gradually larger toward the downstream side, with a larger inner diameter.

The flow path of the guiding cylinder section 51 has, at the upstream end in the discharge direction, a cross-sectional area larger than that of the exhaust pipe 40 at its downstream end. This defines an outside air introducing section 53 between (i) the outer circumferential portion of the downstream end of the exhaust pipe 40 and (ii) the inner circumferential portion of the upstream end of the outside air mixing cylinder 50 (guiding cylinder section 51). The former is separated from the latter by a gap to define an outside air introducing section 53 which gap is suited to produce an ejector effect for suction of outside air with use of the flow of exhaust gas H from the exhaust port 41 of the exhaust pipe 40.

The guiding cylinder section 51 has a length in the discharge direction which length allows exhaust gas H from the exhaust pipe 40 to slow to some degree. Specifically, the length, which should also depend on the velocity of flow of exhaust gas H, desirably allows the exhaust gas H to slow to some degree and likely follow the inner surface of the expanding cylinder section 52 as a result of a Coanda effect described later.

The expanding cylinder section 52 is continuous with the downstream end of the guiding cylinder section 51, and flares out, that is, has a flow path with a cross-sectional area that becomes gradually larger, toward the downstream side. The expanding cylinder section 52 flares out across an angle adjusted appropriately to cause exhaust gas H to follow the inner surface as a result of the Coanda effect and to cause an appropriate amount of outside air G to enter the expanding cylinder section 52 through its outlet 50B. If the angle were excessively large, exhaust gas H would not easily follow the inner surface as a result of the Coanda effect. If the angle were excessively small, only a small amount of outside air G would enter the expanding cylinder section 52.

The guiding cylinder section 51 and the expanding cylinder section 52 are each in the shape of an angular pipe with a rectangular or substantially rectangular cross section. The guiding cylinder section 51 has two vertical walls 51a and two lateral walls 51b, whereas the expanding cylinder section 52 also has two vertical walls 52a and two lateral walls 52b. The vertical walls 51a and 52a are each in the form of a flat surface portion extending in the up-down direction, whereas the lateral walls 51b and 52b are each in the form of a flat surface portion extending in the left-right direction. The vertical walls 51a and 52a each have an inner surface extending along flat surface portions 40a of the exhaust pipe 40, the flat surface portions 40a being at the end having the exhaust port 41 and extending in the up-down direction.

The laterally outer vertical wall 51a of the guiding cylinder section 51 and the laterally outer vertical wall 52a of the expanding cylinder section 52 are together made of a single plate. Bending the plate laterally outward at a position to serve as the boundary between the guiding cylinder section 51 and the expanding cylinder section 52 forms a laterally outer vertical wall 51a for the guiding cylinder section 51 and a laterally outer vertical wall 52a for the expanding cylinder section 52 downstream of the guiding cylinder section 51.

The laterally inner vertical wall 51a of the guiding cylinder section 51 and the laterally inner vertical wall 52a of the expanding cylinder section 52 are also together made of a single plate. Bending the plate laterally inward at a position to serve as the boundary between the guiding cylinder section 51 and the expanding cylinder section 52 defines a laterally inner vertical wall 51a for the guiding cylinder section 51 and a laterally inner vertical wall 52a for the expanding cylinder section 52 downstream of the guiding cylinder section 51.

The upper lateral wall 51b of the guiding cylinder section 51 and the upper lateral wall 52b of the expanding cylinder section 52 are together made of a single plate. Bending the plate upward at a position to serve as the boundary between the guiding cylinder section 51 and the expanding cylinder section 52 forms an upper lateral wall 51b for the guiding cylinder section 51 and an upper lateral wall 52b for the expanding cylinder section 52.

The lower lateral wall 51b of the guiding cylinder section 51 and the lower lateral wall 52b of the expanding cylinder section 52 are together made of a single plate. Bending the plate downward at a position to define and function as the boundary between the guiding cylinder section 51 and the expanding cylinder section 52 defines a lower lateral wall 51b for the guiding cylinder section 51 and a lower lateral wall 52b for the expanding cylinder section 52.

Figure 4:
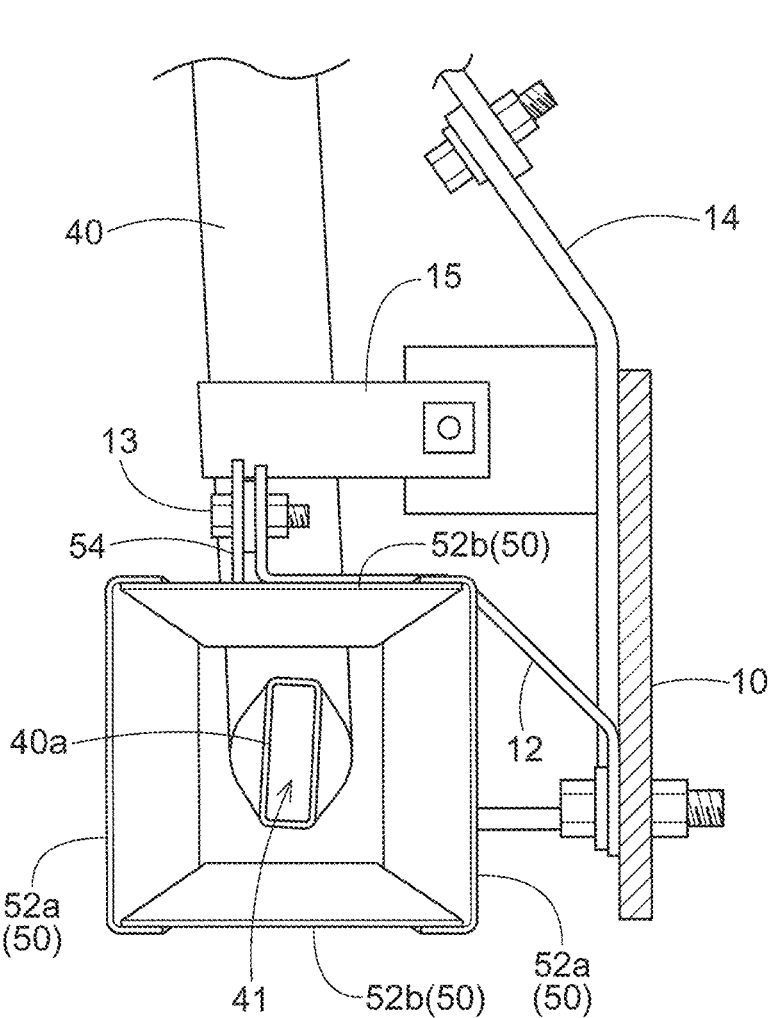
FIG. 4 illustrates the exhauster device in FIG. 3 as viewed along line IV-IV.

As illustrated in FIG. 4, the vertical walls 51a and 52a each have an upper end and a lower end that are bent toward the lateral center of the corresponding one of the guiding cylinder section 51 and the expanding cylinder section 52. The lateral walls 51b and 52b are each in the form of a flat plate.

The respective bent upper ends of the vertical walls 51a and 52a are placed on the respective outer surfaces of the upper lateral walls 51b and 52b, while the respective bent lower ends of the vertical walls 51a and 52a are placed on the respective outer surfaces of the lower lateral walls 51b and 52b. The vertical walls 51a are then welded to the lateral walls 51b on the outer surface of the guiding cylinder section 51, while the vertical walls 52a are welded to the lateral walls 52b on the outer surface of the expanding cylinder section 52.

The outside air mixing cylinder 50 is provided with an attachment bracket 54 welded to the respective upper lateral walls 51b and 52b of the guiding cylinder section 51 and the expanding cylinder section 52 to hold the outside air mixing cylinder 50.

The attachment bracket 54 is, as illustrated in FIGS. 3 and 4, detachably held by a holder arm 12 with use of a coupling bolt 13 which holder arm 12 is attached to the body frame 10.

The exhaust pipe 40 is, as illustrated in FIGS. 2 to 4, not directly held by the body frame 10. While the body frame 10 is provided with a holder leg 14 with an intermediate holder 15 attached thereto, the exhaust pipe 40 is held by the intermediate holder 15 enclosing a portion of the exhaust pipe 40 which portion is close to the distal end.

In other words, that portion of the exhaust pipe 40 which is close to the distal end is not directly attached to the body frame 10, but is held by an intermediate holder 15 attached to a holder leg 14 attached to the body frame 10.

This allows the distal end of the exhaust pipe 40 to be adjusted in position, specifically the exhaust port 41 to be finely adjusted in position in the front-back and left-right directions, through adjustment of, for example, how the holder leg 14 is oriented relative to the body frame 10 as attached thereto and/or what portion of the exhaust pipe 40 the intermediate holder 15 encloses.

The outside air mixing cylinder 50 is, as illustrated in FIGS. 2 to 4, configured such that adjusting how the holder arm 12 is oriented relative to the body frame 10 as attached thereto and/or how the attachment bracket 54 is oriented relative to the holder arm 12 as attached thereto allows the outside air mixing cylinder 50 to be finely adjusted in its vertical position and its inclination relative to a horizontal plane.

This in turn allows the outside air mixing cylinder 50 to be adjusted in orientation relative to the exhaust port 41 of the exhaust pipe 40 for adjustment of how much outside air is to be introduced through the outside air introducing section 53.

Figure 5:
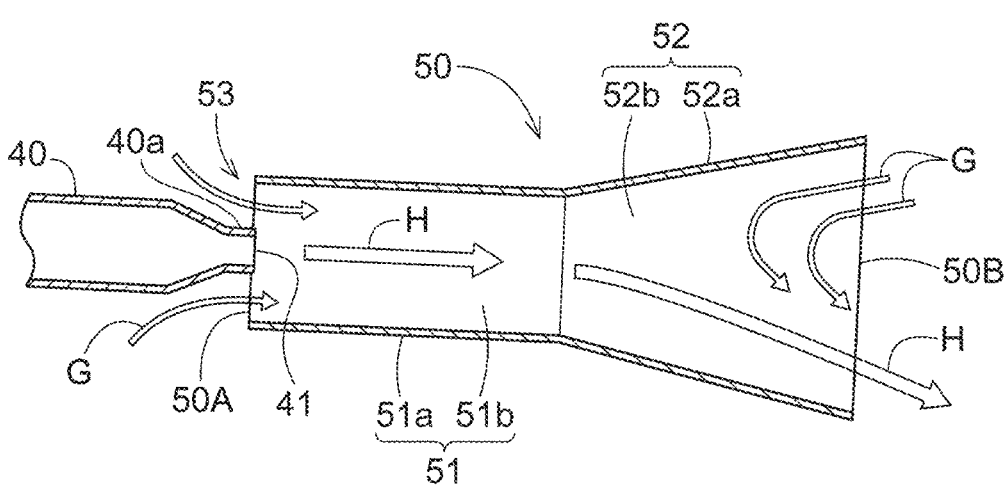
FIG. 5 is a horizontal cross-sectional view of main sections of an exhauster device.

As illustrated in FIGS. 4 and 5, the outside air introducing section 53 is in the form of a gap between the outer circumferential portion of the exhaust pipe 40 and the inner circumferential portion of the outside air mixing cylinder 50. The exhaust pipe 40 and the outside air mixing cylinder 50 are positioned relative to each other so that the gap of the outside air introducing section 53 is substantially constant, with only little variation, along the circumference.

The exhaust port 41 of the exhaust pipe 40 substantially coincides with the inlet 50A of the outside air mixing cylinder 50 in the discharge direction.

FIG. 2 illustrates the front wheels 1F each having been turned by its maximum turning angle. FIG. 3 shows an imaginary line indicative of the front wheels 1F oriented for straight travel.

While FIG. 2 may seem to show that the outside air mixing cylinder 50 overlaps with the right front wheel 1F in a plan view, the outside air mixing cylinder 50 is, as indicated in the side view of FIG. 3, outside the range of movement of the right front wheel 1F.

In other words, although the right front wheel 1F overlaps at an outer edge with the outside air mixing cylinder 50 in a side view when the right front wheel 1F is oriented for straight travel, the outer edge is under the outside air mixing cylinder 50 at a position close to the boundary between the guiding cylinder section 51 and the expanding cylinder section 52 when the right front wheel 1F has been turned by the maximum turning angle. In this state, the guiding cylinder section 51 overlaps with the right front wheel 1F in the front-back direction of the body 1. In contrast, the expanding cylinder section 52, which is forward of the guiding cylinder section 51, corresponds to a portion of the outer edge of the right front wheel 1F which portion has a small height from the ground, allowing that portion with a small height to be under the expanding cylinder section 52. The expanding cylinder section 52 is thereby outside the range of movement of the right front wheel 1F.

The description below deals with how the exhauster device 4 configured as above discharges exhaust gas.

Figure 6:
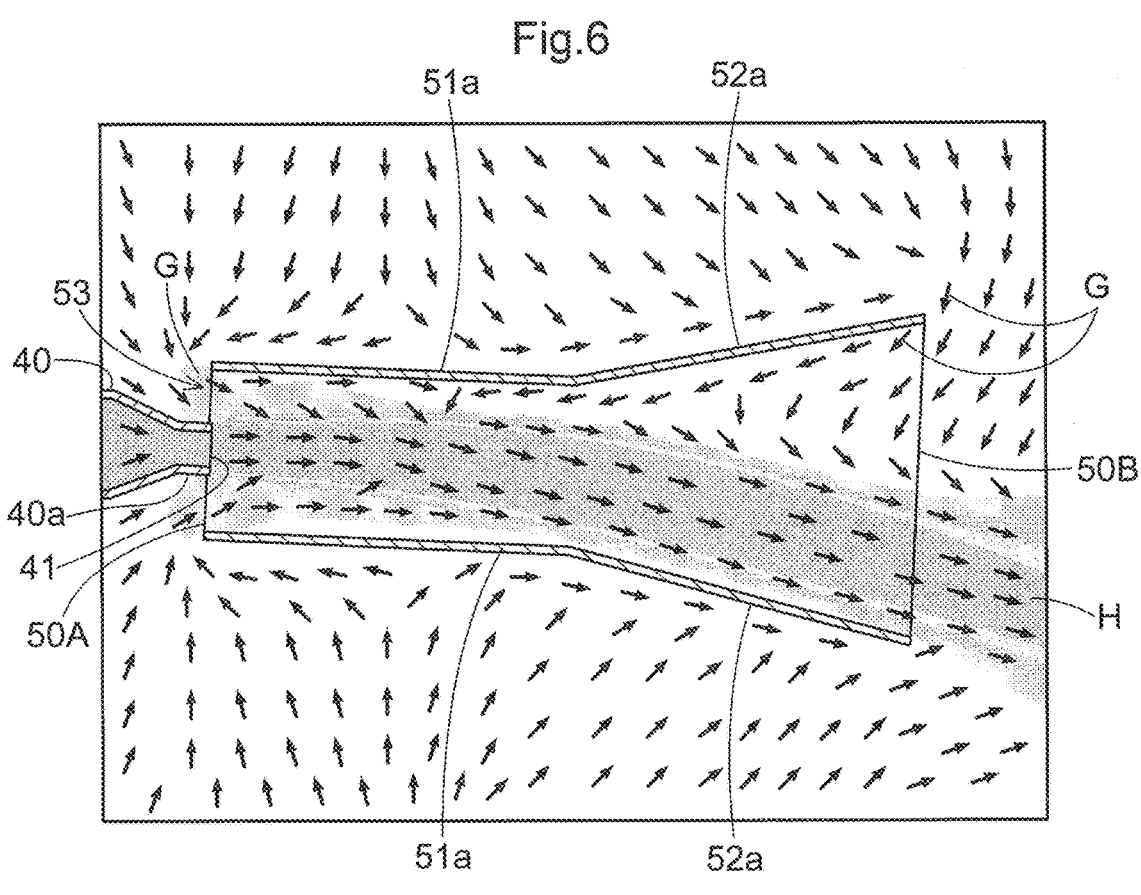
FIG. 6 is a diagram illustrating in a plan view how exhaust gas flows from the outlet of an exhaust pipe into an outside air mixing cylinder and how outside air flows.

FIG. 6 is a diagram schematically illustrating in a plan view how exhaust gas H from the exhaust pipe 40 and outside air G flow.

The drawing shows a large number of short arrows to indicate directions in which gas flows and a dark area to indicate exhaust gas H from the exhaust pipe 40. FIG. 6 shows that the outside air mixing cylinder 50 has inside not only the flow of exhaust gas H from the exhaust pipe 40, but also the flow of outside air G drawn in through the outside air introducing section 53 as well as the flow of outside air G entering the outside air mixing cylinder 50 through the outlet 50B.

The above phenomenon is due to the following. The flow of exhaust gas H from the exhaust pipe 40 causes (i) an ejector effect near the outside air introducing section 53 to draw in outside air G and (ii) a Coanda effect near the outlet 50B of the outside air mixing cylinder 50 to guide the exhaust gas H so that it follows the inner surface of the expanding cylinder section 52 (for the present preferred embodiment, a rightward portion of the inner surface). The expanding cylinder section 52 likely has a relatively low pressure at a portion of its internal space which portion is opposite to the side on which the exhaust gas H is guided. The relatively low internal pressure tends to introduce outside air G through the outlet 50B into that portion.

This causes exhaust gas H from the exhaust pipe 40 to be mixed with both outside air G drawn in through the outside air introducing section 53 and outside air G entering the outside air mixing cylinder 50 through the outlet 50B into mixed air K to be discharged.

Figure 7:
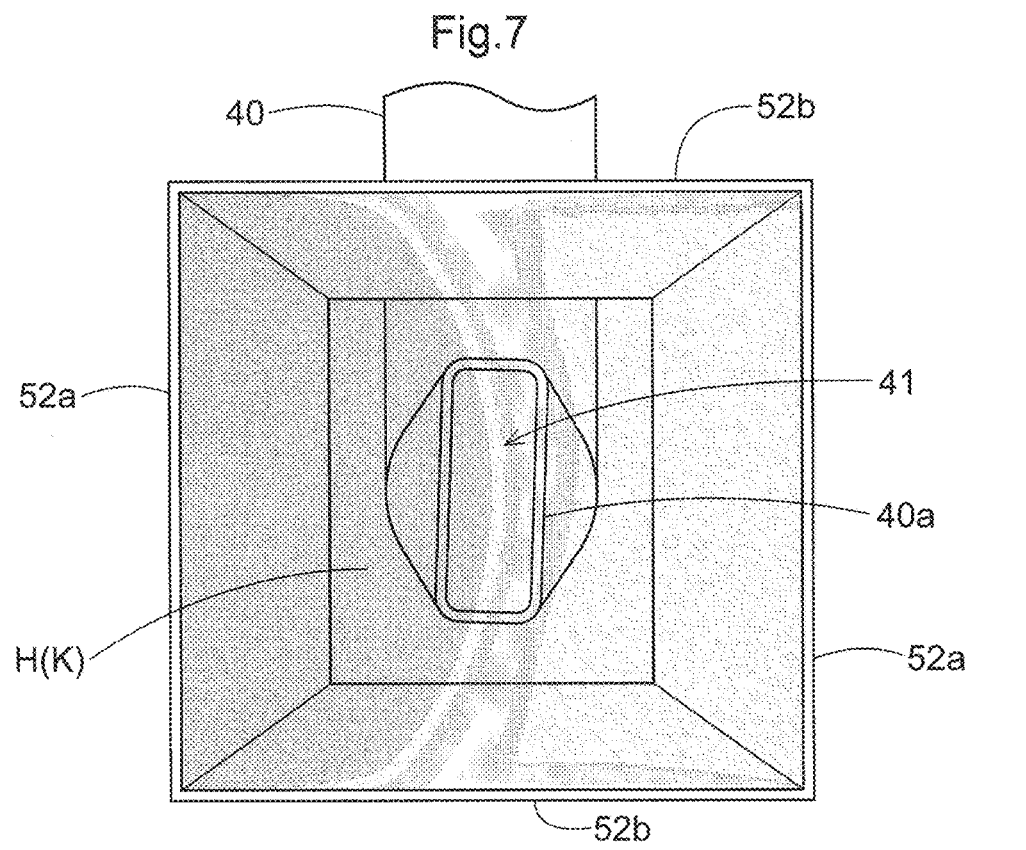
FIG. 7 illustrates in a front view a distribution of the respective discharge velocities of (i) exhaust gas flowing from the outlet of an exhaust pipe through an outside air mixing cylinder to be discharged and (ii) gas containing outside air.

FIG. 7 illustrates how the respective velocities of the exhaust gas H and the outside air G in FIG. 6 are distributed near the outlet 50B of the outside air mixing cylinder 50 as viewed against the discharge direction of the outside air mixing cylinder 50. The drawing shows a dark area to the left to indicate a high velocity and a less dark area to the right to indicate a low velocity. The dark area corresponds to where the exhaust gas H flows in FIG. 6. Specifically, the dark area corresponds to where exhaust gas H is guided due to the Coanda effect, so that it follows a rightward portion of the inner surface of the expanding cylinder section 52. In contrast, outside air G enters a portion of the expanding cylinder section 52 through the outlet 50B which portion is toward a leftward portion of its inner surface and through which portion exhaust gas H is not guided. This causes gas exiting through the outlet 50B to have a low (substantially negative) velocity in the less dark area.

Figures 8, 9:
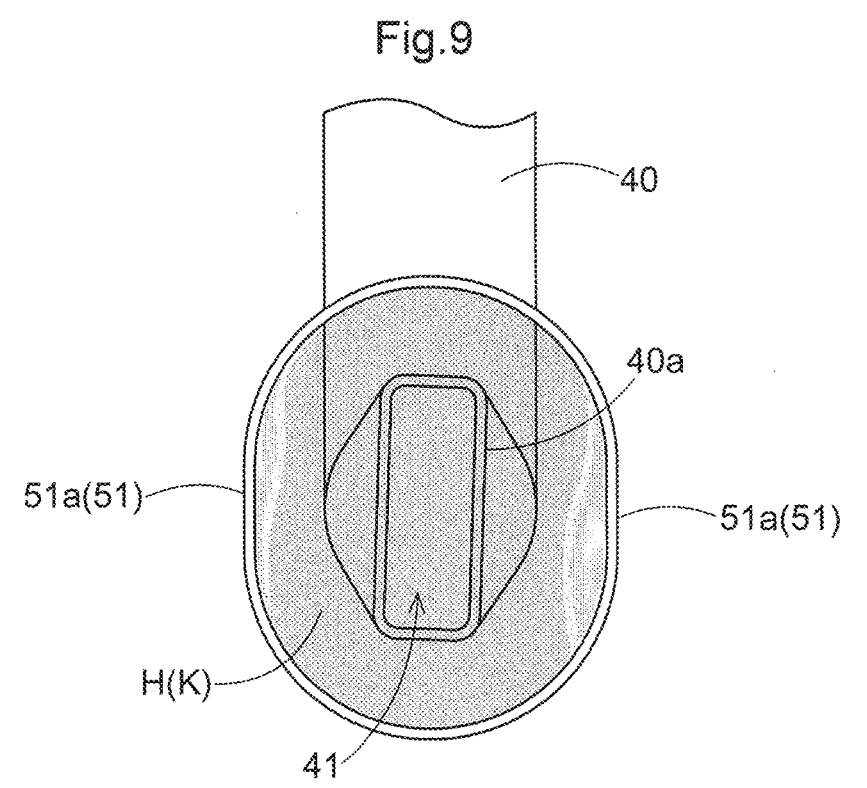
FIG. 8 is a diagram illustrating in a plan view how exhaust gas flows from the outlet of an exhaust pipe into a conventionally structured outside air mixing cylinder and how outside air flows.
FIG. 9 illustrates in a front view a distribution of the respective discharge velocities of (i) exhaust gas flowing from the outlet of an exhaust pipe through a conventionally structured outside air mixing cylinder to be discharged and (ii) gas containing outside air.

FIG. 8 illustrates a conventional example involving a guiding cylinder section 51 alone and thereby having a flow path with a fixed cross-sectional area, unlike preferred embodiments of the present invention, which include an outside air mixing cylinder 50 including a guiding cylinder section 51 and an expanding cylinder section 52.

The conventional example is merely structured such that a typical exhaust pipe 40 and the guiding cylinder section 51 form an outside air introducing section 53 for drawing in outside air G to cause exhaust gas H from the exhaust pipe 40 to be mixed with the outside air G before discharge.

FIG. 9 illustrates a velocity distribution at the outlet of the guiding cylinder section 51 of the conventional structure in a front view. The drawing shows that mixed air K of exhaust gas H and outside air G is discharged with a substantially uniform velocity across the entire outlet of the guiding cylinder section 51. The conventional structure causes no outside air G to enter the guiding cylinder section 51 through its outlet.

FIGS. 10 to 13 provide the results of comparison between (i) the exhauster device 4 according to a preferred embodiment of the present invention, which includes an outside air mixing cylinder 50 including a guiding cylinder section 51 and an expanding cylinder section 52, and (ii) the conventional structure including a guiding cylinder section 51 alone and having a flow path with a fixed cross-sectional area.

Figure 10:
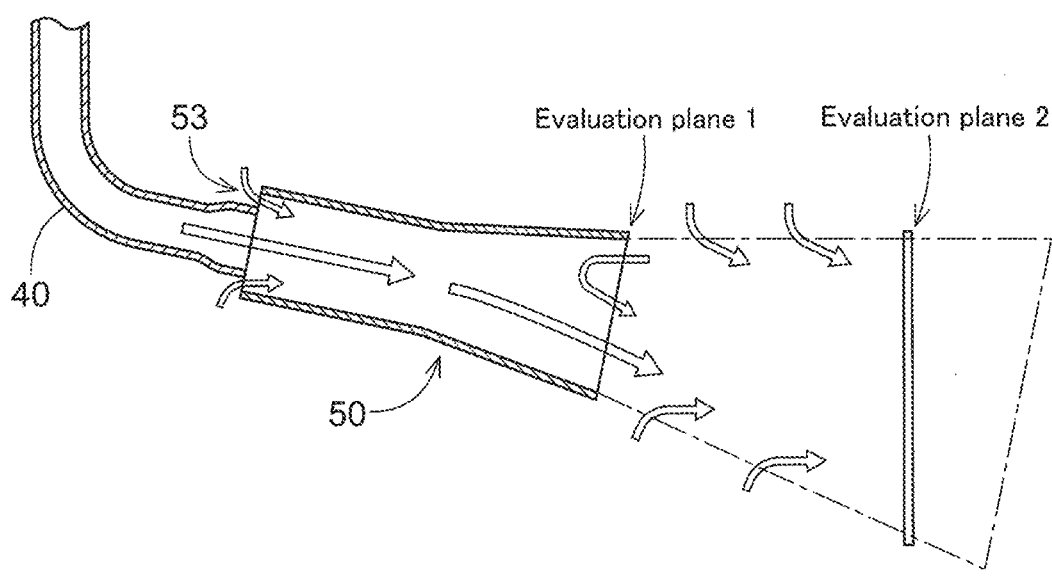
FIG. 10 is a diagram illustrating simulation conditions.
Figure 11:
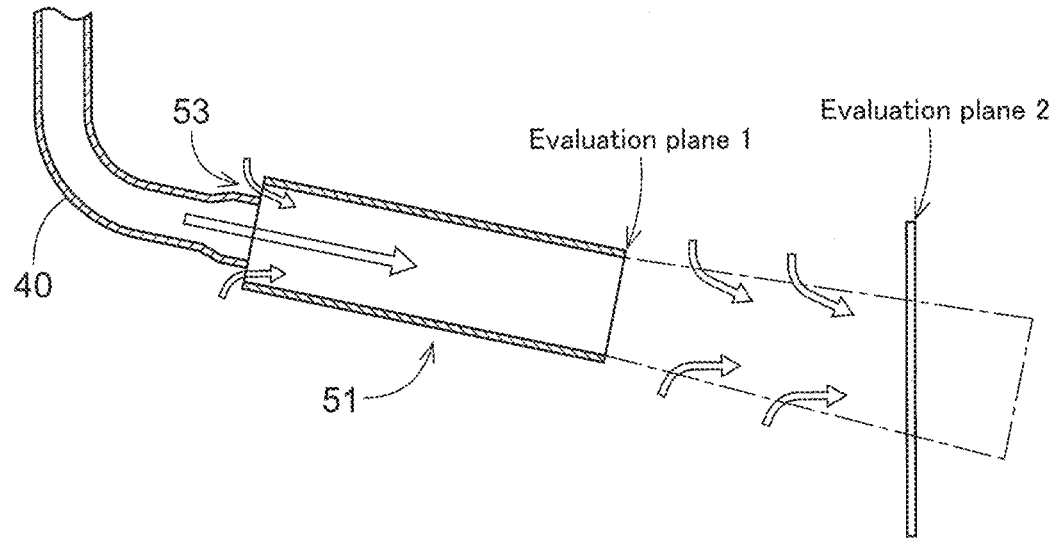
FIG. 11 is a diagram illustrating simulation conditions.

FIG. 10 illustrates a model structured to include the outside air mixing cylinder 50 according to a preferred embodiment of the present invention. FIG. 11 illustrates a model with a conventional structure.

FIGS. 12 and 13 show the results of simulating particular conditions for the two models together with analysis thereof.

FIG. 10 indicates evaluation plane 1 at the outlet of the outside air mixing cylinder 50, whereas FIG. 11 indicates evaluation plane 1 at the outlet of the guiding cylinder section 51.

FIG. 10 indicates evaluation plane 2 at a position apart from the outlet of the outside air mixing cylinder 50 by about 0.2 m, whereas FIG. 11 indicates evaluation plane 2 at a position apart from the outlet of the guiding cylinder section 51 by about 0.2 m.

FIG. 12 shows measurements of exhaust gas in a high-idle state (that is, while the engine is producing a predetermined large output). FIG. 13 shows measurements of exhaust gas in a low-idle state (that is, while the engine is producing a low output).

The "Amount of Outside Air Sucked" column shows how much outside air G was sucked through the outside air introducing section 53.

The two "Amount of Outside Air Pulled in" (corresponding to the amount of outside air G entering the outside air mixing cylinder 50 through the outlet 50B) columns show how much outside air was pulled in at positions other than the outside air introducing section 53. The columns indicate that a preferred embodiment of the present invention caused outside air to be pulled in both at evaluation plane 1 (corresponding to the outlet 50B of the outside air mixing cylinder 50) and at evaluation plane 2 (corresponding to a position apart from the outlet 50B by about 0.2 m) and that the conventional technique did not cause outside air to be pulled in at evaluation plane 1 (corresponding to the outlet of the guiding cylinder section 51) and caused outside air to be pulled in at evaluation plane 2 (corresponding to a position apart from the outlet by about 0.2 m).

The "Amount of Gas Flowed" column shows, for either of a preferred embodiment of the present invention and the conventional technique, the total of (i) the amount of exhaust gas from the exhaust pipe 40, (ii) the amount of outside air G through the outside air introducing section 53, and (iii) the amount of outside air G pulled in at evaluation plane 2 (for the present invention, corresponding to a position apart from the outlet 50B by about 0.2 m).

The analysis results in FIGS. 12 and 13 clearly show that a preferred embodiment of the present invention causes gas to flow at evaluation plane 2 in an amount remarkably larger than that for the conventional technique both in a high-idle state and in a low-idle state.

This proves that preferred embodiments of the present invention allow exhaust gas H from the exhaust pipe to be cooled and thinned more effectively than conventional.

Alternative Preferred Embodiments

The description below deals with alternative preferred embodiments, which may be combined with one another as long as such combination causes no contradiction. The present invention is not limited in scope to the alternative preferred embodiments.

(1) The preferred embodiment described above (hereinafter referred to as "first preferred embodiment") includes an outside air mixing cylinder 50 structured to have a rectangular or substantially rectangular cross section as an example. The outside air mixing cylinder 50 is, however, not necessarily structured as such, and may instead have a cross section in the shape of, for example, a polygon such as a pentagon or more, or even a non-polygon such as a circle or an oblong.

Such an alternative preferred embodiment may be otherwise configured similarly to the first preferred embodiment.

(2) The outside air mixing cylinder 50 does not necessarily have a cross section in the shape of a regular polygon or a circle. The cross section may be in the shape of a polygon with unequal sides or a non-circle. The outside air mixing cylinder 50, in short, desirably has a flat portion at least partially along the circumference to easily cause a Coanda effect.

Such an alternative preferred embodiment may be otherwise configured similarly to the first preferred embodiment.

(3) The first preferred embodiment is an example that includes an outside air mixing cylinder 50 including a guiding cylinder section 51 and an expanding cylinder section 52. The guiding cylinder section 51 includes a flow path with a fixed or substantially fixed cross-sectional area. The expanding cylinder section 52 includes a flow path with a cross-sectional area that becomes gradually larger toward the downstream side, with a larger inner diameter. The outside air mixing cylinder 50 is, however, not necessarily structured as such. The guiding cylinder section 51 may, for instance, have a flow path with a cross-sectional area that becomes slightly smaller or gradually larger. In this case, the expanding cylinder section 52 desirably has a flow path with a cross-sectional area that becomes larger at a rate higher than the rate for the guiding cylinder section 51.

Such an alternative preferred embodiment may be otherwise configured similarly to the first preferred embodiment.

(4) The first preferred embodiment is an example structured to cause exhaust gas H to flow through a portion of the outside air mixing cylinder 50 which portion is laterally outward relative to the body 1 due to a Coanda effect. The first preferred embodiment may alternatively be structured to cause exhaust gas H to flow at a portion of the outside air mixing cylinder 50 which portion is laterally central of the body 1.

The first preferred embodiment may further alternatively be structured to cause exhaust gas H to flow through an upward or downward portion, or even an oblique portion such as a laterally downward portion.

Such an alternative preferred embodiment may be otherwise configured similarly to the first preferred embodiment.

Figure 15:
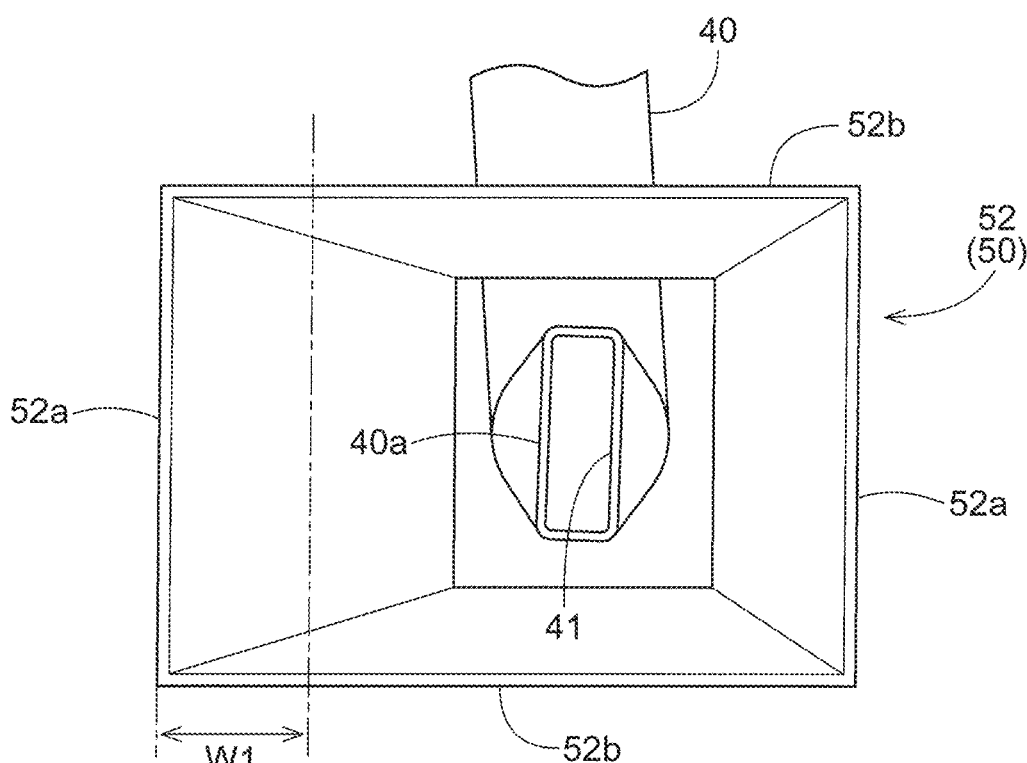
FIG. 15 is a front view of an outside air mixing cylinder for an alternative preferred embodiment of the present invention.

(5) The first preferred embodiment is an example including an outside air mixing cylinder 50 having a cross section in the shape of a laterally symmetrical rectangle. The outside air mixing cylinder 50 is, however, not necessarily shaped as such. For instance, as illustrated in FIG. 15, the expanding cylinder section 52 may have a cross section in the shape of a laterally asymmetrical rectangle, with one side farther outward than its opposite side by a predetermined dimension w1.

Such an alternative preferred embodiment may be otherwise configured similarly to the first preferred embodiment.

Figure 14:
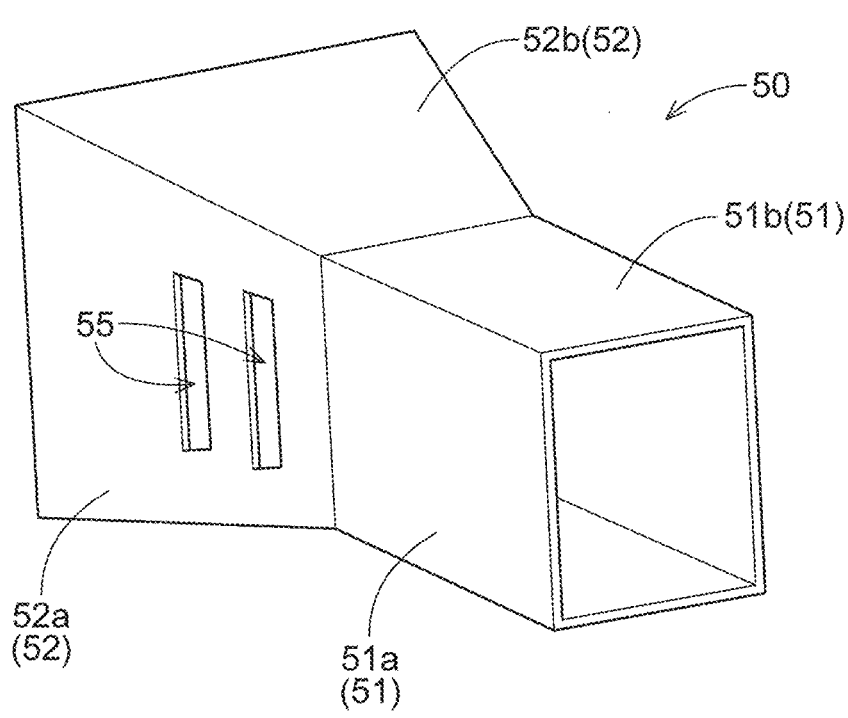
FIG. 14 is a perspective view of an outside air mixing cylinder for an alternative preferred embodiment of the present invention.

(6) The first preferred embodiment is an example including an outside air mixing cylinder 50 in the form of a cylinder with no hole. The outside air mixing cylinder 50 is, however, not necessarily configured as such. For instance, as illustrated in FIG. 14, the expanding cylinder section 52 may have outside air drawing slits 55 in a wall opposite to the wall that exhaust gas H follows due to a Coanda effect. The outside air drawing slits 55 function to increase the amount of outside air G drawn into the outside air mixing cylinder 50.

Such an alternative preferred embodiment may be otherwise configured similarly to the first preferred embodiment.

(7) The first preferred embodiment includes an exhaust pipe 40 with flat surface portions 40a resulting from laterally compressing a portion close to the exhaust port 41. The exhaust pipe 40 is, however, not necessarily structured as such, and may have no flat surface portions 40a.

Such an alternative preferred embodiment may be otherwise configured similarly to the first preferred embodiment.

(8) The first preferred embodiment is an example including an exhaust pipe 40 and an outside air mixing cylinder 50 arranged such that a single straight line connects the respective areal centers of the exhaust port 41, the guiding cylinder section 51, and the expanding cylinder section 52 as viewed in the discharge direction. The first preferred embodiment is, however, not necessarily structured as such. The respective areal centers (areal centers of gravity) may not be connected by a single straight line as above.

Such an alternative preferred embodiment may be otherwise configured similarly to the first preferred embodiment.

(9) The first preferred embodiment is an example including an outside air mixing cylinder 50 including a guiding cylinder section 51 and an expanding cylinder section 52 that gradually becomes wider than the guiding cylinder section 51 both to the left and to the right as viewed in the discharge direction. The outside air mixing cylinder 50 is, however, not necessarily structured as such. For instance, one of the vertical walls 52a of the expanding cylinder section 52 may alternatively be flush with that vertical wall 51a of the guiding cylinder section 51 which is on the same side, so that the expanding cylinder section 52 does not become wider.

Such an alternative preferred embodiment may be otherwise configured similarly to the first preferred embodiment.

(10) The first preferred embodiment is structured to guide exhaust gas H cleaned by the exhaust gas cleaning device 23 to the right relative to the body 1 and discharge the exhaust gas H forward of the body 1. The first preferred embodiment is, however, not necessarily structured as such. For instance, the first preferred embodiment may alternatively be structured to guide exhaust gas H cleaned by the exhaust gas cleaning device 23 to the left relative to the body 1 and discharge the exhaust gas H forward of the body 1 or to discharge the exhaust gas H backward of the body 1.

Such an alternative preferred embodiment may be otherwise configured similarly to the first preferred embodiment.

The first preferred embodiment is a tractor as an example work machine. The work machine may alternatively be any of various work machines such as a mower and a conveyer vehicle as well as a work machine including travel devices other than wheels such as crawler travel devices.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work machine, comprising:

a body;

an engine in the body;

an exhaust pipe to allow exhaust gas from the engine to flow through the exhaust pipe; and an outside air mixing cylinder located downstream of the exhaust pipe and including an upstream end including a flow path with a cross-sectional area larger than a cross-sectional area of a flow path at a downstream end of the exhaust pipe to define an outside air introducing section between an outer circumferential portion of the downstream end of the exhaust pipe and an inner circumferential portion of the upstream end of the outside air mixing cylinder; wherein the outside air mixing cylinder includes:

a guiding cylinder section located upstream, including a downstream end, and including a flow path with a uniform cross-sectional area from a starting end of the flow path to a distal end of the flow path; and an expanding cylinder section continuous with the downstream end of the guiding cylinder section and including a flow path with a cross-sectional area that increases constantly from a starting end of the flow path to a distal end of the flow path;

the guiding cylinder section includes an exhaust gas guide path to guide exhaust gas from the downstream end of the exhaust pipe in a discharge direction of the exhaust pipe;

the expanding cylinder section includes a structure to use the cross-sectional area of the flow path thereof that becomes larger in diameter to cause a Coanda effect on the exhaust gas so that the exhaust gas follows an inner surface of the expanding cylinder section; and the outside air mixing cylinder has a rectangular or substantially rectangular cross section.

2. The work machine according to claim 1, wherein the guiding cylinder section includes a flat inner surface portion; and the expanding cylinder section includes a flat inner surface portion.

3. The work machine according to claim 1, wherein the downstream end of the exhaust pipe includes two flat wall portions circumferentially opposite to each other.

4. The work machine according to claim 3, wherein the guiding cylinder section includes a flat inner surface portion;

the expanding cylinder section includes a flat inner surface portion; and the two flat wall portions are parallel or substantially parallel with the respective flat inner surface portions of the guiding cylinder section and the expanding cylinder section.

5. The work machine according to claim 1, wherein the exhaust pipe and the outside air mixing cylinder are arranged such that a single straight line connects respective areal centers of an exhaust port of the exhaust pipe, the guiding cylinder section, and the expanding cylinder section as viewed in the discharge direction.

6. The work machine according to claim 1, wherein the exhaust pipe includes a distal end that coincides or substantially coincides with a starting end of the outside air mixing cylinder in the discharge direction.

7. The work machine according to claim 1, wherein the exhaust pipe first guides the exhaust gas from laterally inward of the body toward laterally outward of the body and then changes a direction of the guide to a front-back direction of the body at a laterally outer portion of the body for discharge of the exhaust gas.

8. The work machine according to claim 7, wherein the outside air mixing cylinder is between a body frame of the work machine and a front wheel of the work machine in a left-right direction of the body; and the guiding cylinder section overlaps with the front wheel in the front-back direction of the body; and the expanding cylinder section is outside a range of movement of the front wheel.

* * * * *